(12) United States Patent
Xu

(10) Patent No.: US 11,002,663 B2
(45) Date of Patent: May 11, 2021

(54) GAS INJECTION DEVICE

(71) Applicant: JIANGSU LEUVEN INSTRUMENTS CO LTD, Jiangsu (CN)

(72) Inventor: Kaidong Xu, Leuven (BE)

(73) Assignee: JIANGSU LEUVEN INSTRUMMENTS CO LTD, Jiangsu (CN)

( * ) Notice: Subject to any disclaimer, the term of this patent is extended or adjusted under 35 U.S.C. 154(b) by 132 days.

(21) Appl. No.: 16/232,563

(22) Filed: Dec. 26, 2018

(65) Prior Publication Data
US 2019/0128795 A1 May 2, 2019

Related U.S. Application Data

(63) Continuation of application No. PCT/CN2017/084102, filed on May 12, 2017.

(30) Foreign Application Priority Data

Jul. 1, 2016 (CN) .......................... 201610520818.5

(51) Int. Cl.
*G01N 21/01* (2006.01)
*G01N 15/08* (2006.01)

(52) U.S. Cl.
CPC ......... *G01N 21/01* (2013.01); *G01N 15/0806* (2013.01); *G01N 15/088* (2013.01);
(Continued)

(58) Field of Classification Search
CPC .. G01N 21/01; G01N 15/0806; G01N 15/088; G01N 2015/0846; G01N 21/211
See application file for complete search history.

(56) References Cited

U.S. PATENT DOCUMENTS

| 4,741,286 A | 5/1988 | Itoh et al. |
| 6,435,008 B2 * | 8/2002 | Baklanov ............... G01N 15/08 356/137 |

(Continued)

FOREIGN PATENT DOCUMENTS

| CN | 87104313 A | 7/1988 |
| CN | 1797220 A | 7/2006 |

(Continued)

OTHER PUBLICATIONS

International Search Report for PCT Application No. PCT/CN2017/084102; State Intellectual Property Office of P.R. China; Beijing, China; dated Aug. 17, 2017.

(Continued)

*Primary Examiner* — Maurice C Smith
(74) *Attorney, Agent, or Firm* — Thomas E. Lees, LLC

(57) ABSTRACT

A gas injection device, wherein comprising: a gas channel including an air inlet provided at a upper portion therein and a gas outlet provided at a lower portion therein; and a light channel including an incident light channel and a reflected light channel provided at each side of the gas channel separately, wherein gases arrives at a surface of a sample to be tested via said gas channel and flows out from a slit between said light channel, the gas outlet of gas channel, and the surface of the sample to be tested, and gases flow in a manner of laminar flow with the Peclet number of an air flow being larger than 1. The gas injection device can effectively prevent air from returning back to the measurement system.

9 Claims, 3 Drawing Sheets

(52) U.S. Cl.
CPC ............... *G01N 2015/0846* (2013.01); *G01N 2021/0106* (2013.01)

(56) References Cited

U.S. PATENT DOCUMENTS

| | | | |
|---|---|---|---|
| 6,662,631 B2 | 12/2003 | Baklanov et al. | |
| 7,426,030 B1* | 9/2008 | Liphardt | G01J 1/02 |
| | | | 356/367 |
| 7,568,379 B2 | 8/2009 | Simon et al. | |
| 2006/0254374 A1 | 11/2006 | Baklanov et al. | |
| 2008/0180698 A1* | 7/2008 | Kwak | G01B 11/0633 |
| | | | 356/630 |
| 2009/0027679 A1* | 1/2009 | Pfeiffer | G01N 21/05 |
| | | | 356/440 |
| 2011/0019207 A1* | 1/2011 | Licitra | G01N 21/956 |
| | | | 356/625 |
| 2013/0301047 A1 | 11/2013 | Bonacina et al. | |
| 2015/0376787 A1* | 12/2015 | McGraw | C23C 14/04 |
| | | | 118/724 |
| 2017/0101711 A1* | 4/2017 | McGraw | C23C 14/12 |
| 2020/0088629 A1* | 3/2020 | Tsuruga | G01N 21/211 |

FOREIGN PATENT DOCUMENTS

| | | |
|---|---|---|
| CN | 101117655 A | 2/2008 |
| CN | 104046565 A | 9/2014 |
| CN | 104250728 A | 12/2014 |
| CN | 105316651 A | 2/2016 |
| CN | 105445201 A | 3/2016 |

OTHER PUBLICATIONS

Written Opinion of the International Searching Authority for PCT Application No. PCT/CN2017/084102; State Intellectual Property Office of the P.R. China; Beijing, China; dated Aug. 17, 2017.

Translation of the International Search Report for PCT Application No. PCT/CN2017/084102; State Intellectual Property Office of the P.R. China; Beijing, China; dated Aug. 17, 2017.

Bourgeois, A., et al; "Adsorption and Desorption Isotherms at Ambient Temperature Obtained by Ellipsometric Porosimetry to Probe Micropores in Ordered Mesoporous Silica Films"; Adsorption 11:195-199; 2005.

Translation of Written Opinion of the International Searching Authority for PCT Application No. PCT/CN2017/084102; State Intellectual Property Office of the P.R. China; Beijing, China; dated Aug. 17, 2017.

Chinese Office Action for Chinese Patent Application No. 201610520818.5; dated Nov. 28, 2018.

* cited by examiner

GAS INJECTION DEVICE

CROSS REFERENCE TO RELATED APPLICATIONS

This is a Continuation application of International Application Serial No. PCT/CN2017/084102, filed on May 12, 2017, which claims the benefit of Chinese Application No. 201610520818.5, filed on Jul. 1, 2016, the disclosures of which are hereby incorporated by reference.

BACKGROUND

The present invention relates to the field of sample analysis, more particularly, to a gas injection device.

Porous films have extensive applications in the field of microelectronics (low dielectric constant membrane), cell membranes, catalytic membranes, and sensors. Specifically, as a kind of low dielectric constant dielectric, porous films is widely used in ultra-large integrated circuit device. The porosity of materials can be studied by ellipsometry, and the thickness and parameters of a porous layer can be studied in a solvent vapor environment. For the reason that a change in refractive index of porous material is a function of the relative pressure change of the solvent vapor, so the volume of the solvent fed into pores can be determined and an isotherm curve can be drawn. Therefore, the porosity of a porous material can be measured and its mechanical and electrical properties can be studied. Methods to evaluate porous low-k film by means of ellipsometry are disclosed in patent literature documents 1-4 and non-patent literature documents below.

Patent literature 1: U.S. Pat. No. 6,435,008 B2
Patent literature 2: U.S. Pat. No. 6,662,631
Patent literature 3: US 2006/0254374 A1
Patent literature 4: U.S. Pat. No. 7,568,379 B2

Non-patent literature: Adsorption and Desorption Isotherms at Ambient Temperature Obtained by Ellipsometric Porosimetry to Probe Micropores in Ordered Mesoporous Silica Films. Bourgeois A., Brunet-Bruneau A., Fisson S., Rivori J. Adsorption 11:195-199, 2005

However, demerits disclosed above lie in the fact that a special chamber is employed for sample testing, which limits the size of the sample. Another demerit relates to volume of the chamber, which takes a long time to fill or change the atmosphere of the chamber. Furthermore, filling the chamber needs a lot of solvent vapor, resulting in relatively high cost of measurement.

An alternative system and method is disclosed in the invention patent application numbered as 201510751567.7 which was submitted by the present inventor, and this new system is on basis of an injection airflow forming system with no need for a chamber. Firstly, adsorbent vapor and carrier gas are mixed together and each constituent gas is subject to differential pressure control; secondly, size of the resulting airflow is controllable and close to the size of a laser beam spot on the surface to be tested. This results in that the dose of adsorbent required by this system declines significantly with comparison to the chamber-based system. In addition, as the sample can be moved in the process of testing, there is no restriction on sample size.

But, in this sample analysis system, the employed gas injection device to form injection airflow is critical, especially in the case of low-speed flow. When the flow rate is too low, air will possibly diffuse into the gas injection device and further enter into the mixed gases, causing a change in the partial pressure of the gas.

BRIEF SUMMARY

The purpose of the present invention is to provide a gas injection device, wherein comprising: a gas channel, which includes an air inlet at the upper part gas channel and an gas outlet at the lower part; and an light channel, which comprises incident light channel and reflected light channel, which are provided on each side of said gas channel respectively. Specifically, the gas gets to surface of the sample to be tested through said gas channel, and flows out from the light channel and the slit formed between the surface of the sample to be tested and the gas outlet of the gas channel. Gas flows in a manner of laminar flow and the Peclet number of the airflow is greater than 1.

Preferably, the inner diameter of the gas channel, the inner diameter of the light channel, and the distance from gas channel gas outlet to the surface of the sample to be tested meet the following relational expression:

$$Fd/\pi(d^2/2+Dh)\mu<200,$$

wherein, F denotes the gas flow; d denotes the inner diameter of the light channel; D denotes the inner diameter of the gas outlet of the gas channel; h denotes the height between the gas channel gas outlet to the surface of the sample to be tested; $\mu$ denotes kinematic viscosity.

Preferably, the inner diameter of the gas outlet is greater than that of said air inlet.

Preferably, the inner diameter of the gas outlet is 0.1-250 mm.

Preferably, the inner diameter of the light channel is 0.5-20 mm.

Preferably, the height from the gas outlet of the gas channel to the surface of the sample to be tested is 0.1-10 mm.

Preferably, the length of the gas channel is 0.1-10 cm.

Preferably, the inner diameter of the air inlet of the gas channel is 0.1-20 mm.

Preferably, the diameter of surface where gas channel gas outlet will be formed is 1-300 mm.

DETAILED DESCRIPTION

In order to make the intention, technical solutions and advantages of the present invention more explicit, a clear and complete description of the technical solutions in embodiments of the present invention will be made on the basis of embodiment drawings of the present invention. It should be understood that preferred embodiments described here is used only to explain the present invention, not to limit the present invention. Described embodiments are only a portion but not all embodiments of the present invention. All other embodiments without inventive work obtained by the people skilled in the art on basis of the embodiment of present invention will fall in the protection scope thereof.

Figure 1:
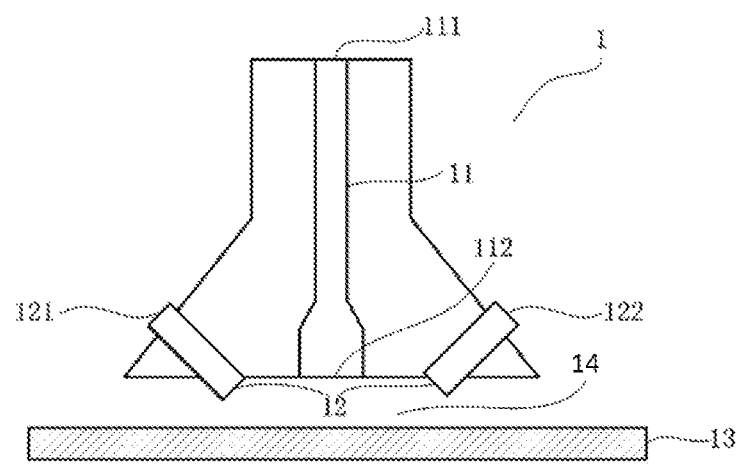
FIG. 1 shows schematic structural view of the gas injection devices.

FIG. 1 shows a schematic structural view of an embodiment of the gas injection device. The gas injection device 1 of the present invention comprises: a gas channel 11, which includes an air inlet 111 and a gas outlet 112, wherein the air inlet 111 is provided at the upper portion of the gas injection device 1 and the gas outlet 112 is provided at the lower portion of the gas injection device 1. Preferably, the inner diameter of the gas outlet 112 is larger than that of the air inlet 111. The gas injection device 1 also contains a light channel 12, which includes incident light channel 121 and reflected light channel 122. They are provided on each side of the gas channel respectively. The gas arrives at the surface of a sample to be tested 13 via the gas channel 11 and flow out from the light channel 12 and the slit 14 between a surface of the sample to be tested 13 and the gas outlet 112 of the gas channel 11.

Specific parameters of the light channel and the gas channel are set to ensure that solvent vapor can flow in a manner of laminar flow in the process of testing.

First, we need to define the airflow and calculate the flow rate. The flow rate can be obtained via V=F/S. Wherein, V is the flow rate, F is the air flow volume. Assuming that the sum of the cross-sectional area S1 of the light channel 12 and the side surface area S2 of the slit 14 which is between the gas outlet 112 of the gas channel 11 and the surface 13 of the sample to be tested is taken as the airflow cross-sectional area S, i.e. $S=S_1+S_2$, wherein, the cross-sectional area 51 of the light channel 12 is the sum of the cross-sectional area of the incident light channel 121 and that of the reflected light channel 122. Further assuming that both the cross-sections of the incident light channel 121 and that of the reflected light channel 122 are circles, and diameters of them are d, then $S_1=\pi d^2/2$, assuming that the side superficial area S2 of the slit 14 from gas outlet 112 of gas channel 11 to surface of the sample to be tested 13 is the superficial area of a cylindrical and that the diameter of the gas outlet 112 is D, the height of the slit 14 is h, then $S_2=\pi Dh$, so we can obtain the cross-sectional area of the air flow as $S=\pi d^2/2+\pi Dh$.

Next, we need to calculate Reynolds number R, which is the basis for discriminating flow characteristics, $R=Vd/\mu$, wherein, $\mu$ is dynamic viscosity. If the used gas is air, then $\mu=2.2\times10^{-5}$ m²/s.

In the present invention, the gas flows in a manner of laminar flow when Reynolds number is less than 200. In that case, the inner diameter D of the gas outlet 112 of the gas channel 11, the inner diameter d of the light channel 12, and the height h of the slit 14 i.e. the height from gas outlet 112 of gas channel 11 to a surface of the sample to be tested 13 meet the relational expression below, so that the gas can flow in a manner of laminar flow:

$Fd/\pi(d^2/2+Dh)\mu<200$, wherein F is gas flow, d is the inner diameter of the light channel, D is the inner diameter of the gas outlet of the gas channel, h is the height from the gas outlet of said gas channel to the surface of the sample to be tested, $\mu$ is dynamic viscosity.

Preferably, the inner diameter of the gas outlet 112 is 0.1-250 mm and that of the light channel 12 is 0.5-20 mm. Preferably, the height from the gas outlet 112 of the gas channel 11 to the surface of the sample to be tested 13 is 0.1-10 mm. The length of the inner diameter of the air inlet 111 of the gas channel is 0.1-20 mm. Preferably, the diameter of the cross-sectional area in the gas injection device where air channel outlet being formed is 1-300 mm.

In a more specific embodiment, the inner diameter d of the light channel 12 of the gas injection device is 3 mm, the inner diameter D of gas outlet 112 of gas channel 11 is 5 mm and the height h of a slit 14 between gas outlet 112 and the surface of sample to be tested 13 is 0.4 mm. Assuming that the range of change of air flow is 2-20 L/h, then the airflow cross-sectional area based upon the formula above can be obtained as S=0.2 cm². When the gas flow is 2 L/h, the flow rate V is 2.8 cm/s, and when the gas flow is 20 L/h, the flow rate V is 28 cm/s. When the gas flow is 2 L/h, R is 6.4, and when the gas flow is 20 L/h, R is 64. It means that the airflow in the gas injection device with the parameters listed above flows in a manner of laminar flow.

In addition, it is necessary for the gas channel 11 to be designed with a sufficient length so as to prevent atmosphere air from returning back to the measurement area. We may use Peclet number Pe to estimate the diffusion and convection of the airflow in the gas injection device of present invention. In the present invention, Pe may be described as $Pe=VL/D_a$, wherein, V denotes flow rate, L denotes length of the gas channel 11, $D_a$ denotes diffusion coefficient of the air in Argon, which approximates as 0.2 cm²/s. When Pe is less than 1, diffusion dominates; and when Pe is larger than 1, the impact of diffusion can be ignored.

Therefore, in this embodiment the gas channel 11 is designed with a sufficient length so as to prevent atmosphere air from returning back to the measurement area. Further preferably, the length L of the gas channel is 0.1-10 cm. Therefore, when the air flow is 2 L/h, Peclet number Pe is 10.5; when the air flow is 20 L/h, Pe is 105. When Pe is greater than 10, the impact of diffusion may be ignored. It shows that gas injection device disclosed in the present invention can effectively prevent backflow of air, in particular when the flow rate is quite low.

Figure 2:
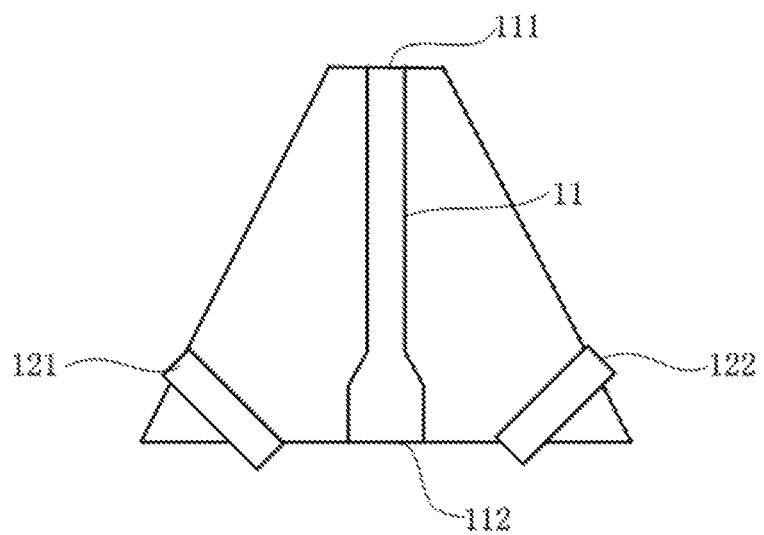
FIG. 2-FIG. 4 show schematic structural views of the gas injection device with different shapes.
Figure 3:
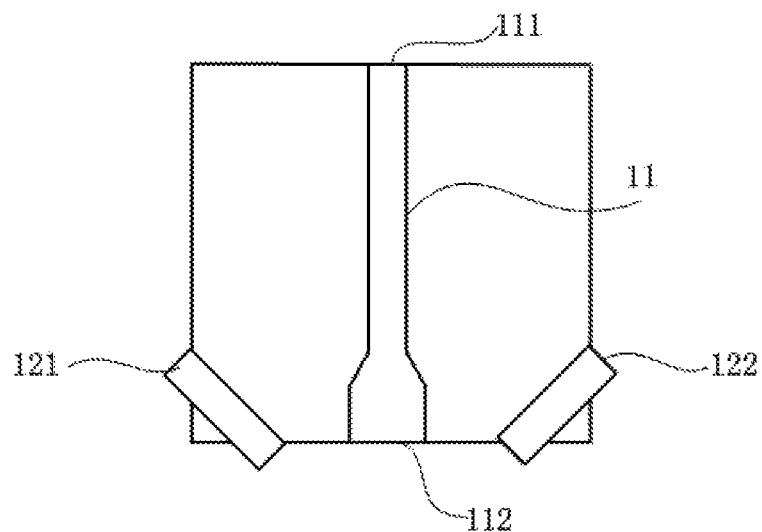
Figure 4:
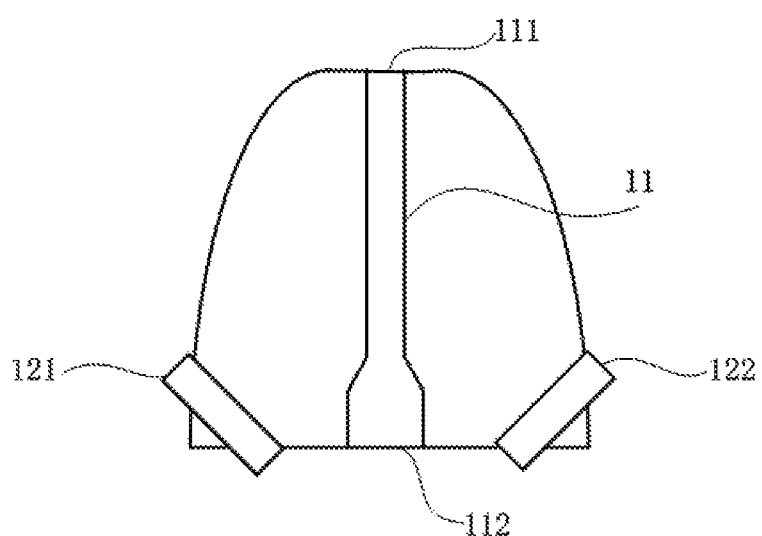

It should be noted that structure of the gas injection device shown in FIG. 1 is only a schematic representation, which shall not be construed as limiting the present invention. Its outer shape can be of any other shape such as a cylinder. For a more clear explanation, FIGS. 2-4 shows schematic structure views of some embodiments of the gas injection device. It is obvious that the gas injection device may be in different shapes. As long as the light channel, the gas channel and the related parameters of the slit 14 satisfy the scope involved in present invention, they all should be covered by the scope of present invention.

Figure 5:
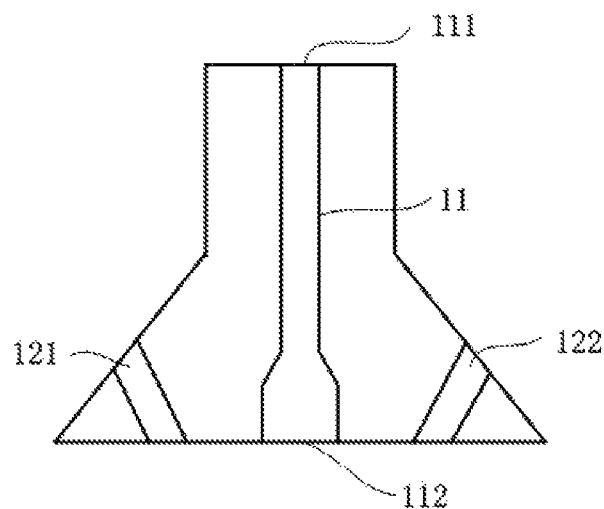
FIG. 5-FIG. 6 show schematic structural views of the gas injection device with light channel being of different shapes.
Figure 6:
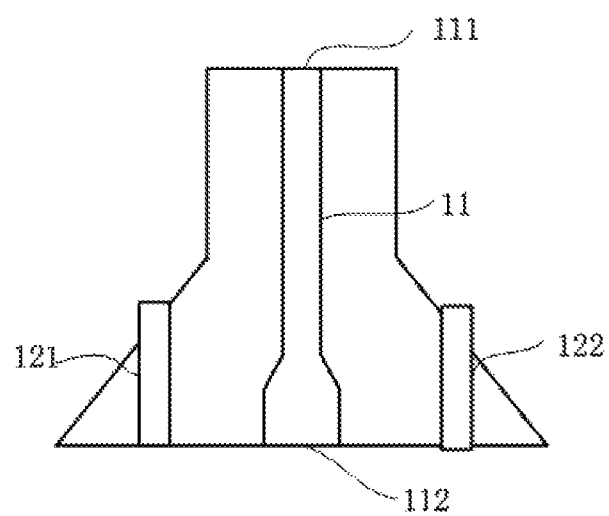

In addition, in the above-described embodiments, the circle shape is taken as an example to calculate the cross-sectional area of the light channel. However, the light channel is not limited to the circular shape. For example, the light channel can be of any shape, such as an ellipse or a rectangle. Size of the inner diameter of incident light channel and reflected light channel can also be different. In addition, the light path may also be non-cylindrical, i.e., the apertures of light incident and exiting through the light path may vary in size. The angle to set light channel and gas channel may be adjusted according to the actual situation. FIGS. 5 and 6 show light channel structure in some embodiments.

The above is only a specific embodiment of the present invention, but the scope of the present invention is not limited thereto, and any person skilled in the art can easily think of changes or substitutions within the technical scope of the present invention, all of which should be covered by the scope of the present invention.

What is claimed is:

1. A gas injection device, wherein comprising:
a gas channel including an air inlet provided at an upper portion therein and a gas outlet provided at a lower portion therein; and
a light channel including an incident light channel and a reflected light channel provided at each side of the gas channel separately,
wherein gases arrives at a surface of a sample to be tested via said gas channel and flows out from said light channel and a slit between the gas outlet of said gas channel and a surface of the sample to be tested, and gases flow in a manner of laminar flow with the Peclet number of an air flow being larger than 1.

2. The gas injection device according to claim 1 wherein, an inner diameter of the gas outlet of the gas channel, an inner diameter of said light channel, and a height from said gas channel to the surface of said sample to be tested meet the next formula:

$$Fd/\pi(d^2/2+Dh)\mu < 200,$$

wherein, F is a volume of gas flow; d is an inner diameter of the light channel; D is an inner diameter of the gas outlet of the gas channel, h is a height from the gas outlet of said gas channel to the surface of said sample to be tested, and $\mu$ is dynamic viscosity.

3. The gas injection device according to claim 1 wherein, an inner diameter of said gas outlet is greater than that of said air inlet.

4. The gas injection device according to claim 1 wherein, an inner diameter for the gas outlet of said gas channel is 0.1-250 mm.

5. The gas injection device according to claim 1 wherein, an inner diameter of said light channel is 0.5-20 mm.

6. The gas injection device according to claim 1, wherein, a height from the gas outlet of said gas channel to the surface of said sample to be tested is 0.1-10 mm.

7. The gas injection device according to claim 1, wherein, a length of said gas channel is 0.1-10 cm.

8. The gas injection device according to claim 1, wherein, an inner diameter for the air inlet of said air channel is 0.1-20 mm.

9. The gas injection device according to claim 1, wherein, a diameter for the surface where the gas outlet of the gas channel being formed is 1-300 mm.

* * * * *

UNITED STATES PATENT AND TRADEMARK OFFICE
CERTIFICATE OF CORRECTION

PATENT NO. : 11,002,663 B2  
APPLICATION NO. : 16/232563  
DATED : May 11, 2021  
INVENTOR(S) : Kaidong Xu Page 1 of 1

It is certified that error appears in the above-identified patent and that said Letters Patent is hereby corrected as shown below:

On the Title Page

Item (73) Assignee: delete the Assignee listed and replace with:  
--Assignee: JIANGSU LEUVEN INSTRUMENTS CO LTD, Jiangsu (CN)--.

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*